US010836102B2

(12) United States Patent
Meinders et al.

(10) Patent No.: US 10,836,102 B2
(45) Date of Patent: Nov. 17, 2020

(54) METHOD AND APPARATUS FOR LAYERWISE PRODUCTION OF A TANGIBLE OBJECT

(71) Applicant: Nederlandse Organisatie voor toegepast—natuurwetenschappelijk onderzoek TNO, s'-Gravenhage (NL)

(72) Inventors: Erwin Rinaldo Meinders, Veldhoven (NL); Herman Hendrikus Maalderink, Nuenen (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 139 days.

(21) Appl. No.: 15/755,963

(22) PCT Filed: Aug. 31, 2016

(86) PCT No.: PCT/NL2016/050607
§ 371 (c)(1),
(2) Date: Feb. 27, 2018

(87) PCT Pub. No.: WO2017/039444
PCT Pub. Date: Mar. 9, 2017

(65) Prior Publication Data
US 2018/0243977 A1 Aug. 30, 2018

(30) Foreign Application Priority Data
Aug. 31, 2015 (EP) .................................. 15183139

(51) Int. Cl.
*B29C 64/135* (2017.01)
*B33Y 10/00* (2015.01)
(Continued)

(52) U.S. Cl.
CPC .......... *B29C 64/135* (2017.08); *B22F 3/1021* (2013.01); *B22F 3/1055* (2013.01);
(Continued)

(58) Field of Classification Search
CPC ... B29C 64/135; B29C 64/282; B29C 64/393; B29C 64/165; B28B 1/001; B33Y 50/02; B22F 2003/1057
See application file for complete search history.

(56) References Cited

U.S. PATENT DOCUMENTS 6,122,564 A * 9/2000 Koch ..................... B23K 26/32
700/123
2010/0098835 A1 4/2010 Wang et al.
(Continued)

FOREIGN PATENT DOCUMENTS

| EP | 2052693 A1 | 4/2009 |
|---|---|---|
| WO | WO 2015/056230 A1 | 4/2015 |
| WO | WO 2015/108552 A1 | 7/2015 |

OTHER PUBLICATIONS

European Patent Office, International Search Report in corresponding International Application No. PCT/NL2016/050607 dated Nov. 8, 2016 (2 pages).
(Continued)

*Primary Examiner* — Jacob T Minskey
*Assistant Examiner* — Adrien J Bernard
(74) *Attorney, Agent, or Firm* — Leydig, Voit & Mayer, Ltd.

(57) ABSTRACT

A layerwise production method of a tangible object (8). A layer of uncured building material is provided onto a carrier (4, 30). Repeatedly, method cycles are performed, each comprising: providing layer data corresponding to an object layer, selectively exposing the layer of building material based on the layer data for curing thereof, and providing a
(Continued)

next layer of building material onto the preceding layer. Each method cycle further includes verifying the cured preceding layer for identifying regions of insufficiently cured building material, and adapting a radiation dose locally for the next layer dependent on whether or not a location to be exposed in accordance with the layer data of the next layer coincides with one of the identified regions of insufficiently cured building material in the preceding layer.

15 Claims, 4 Drawing Sheets

(51) Int. Cl.
*B33Y 30/00* (2015.01)
*B33Y 50/02* (2015.01)
*B29C 64/282* (2017.01)
*B29C 64/393* (2017.01)
*B29C 64/165* (2017.01)
*B22F 3/10* (2006.01)
*B22F 3/105* (2006.01)
*B28B 1/00* (2006.01)

(52) U.S. Cl.
CPC ............ *B28B 1/001* (2013.01); *B29C 64/165* (2017.08); *B29C 64/282* (2017.08); *B29C 64/393* (2017.08); *B33Y 10/00* (2014.12); *B33Y 30/00* (2014.12); *B33Y 50/02* (2014.12); *B22F 2003/1057* (2013.01)

(56) References Cited

U.S. PATENT DOCUMENTS

2012/0130530 A1* 5/2012 Yasukochi ............ B29C 64/135
                                                    700/120
2014/0332507 A1 11/2014 Fockele

OTHER PUBLICATIONS

European Patent Office, European Office Action Communication in corresponding European Application No. 16763982.2 dated Aug. 6, 2020 (7 pages).

* cited by examiner

METHOD AND APPARATUS FOR LAYERWISE PRODUCTION OF A TANGIBLE OBJECT

CROSS-REFERENCE TO RELATED APPLICATIONS

This patent application is a U.S. National Phase of PCT International Application No. PCT/NL2016/050607, filed Aug. 31, 2016, which claims priority to European Application No. 15183139.3, filed Aug. 31, 2015, which are both expressly incorporated by reference in their entireties, including any references contained therein.

FIELD OF THE INVENTION

The present invention is directed at a method for layerwise production of a tangible object, the method comprising: providing a layer of building material onto a carrier; and repeatedly performing method cycles, each method cycle comprising the steps of: providing layer data corresponding to a layer of the tangible object, selectively exposing, using radiation from at least one radiation source, the layer of uncured building material based on the layer data, for curing the building material for forming the layer of the tangible object, and providing a next layer of uncured building material, said next layer being provided consecutive to the selectively exposed preceding layer, for selective exposure thereof during a subsequent method cycle. The invention is further directed at an apparatus for applying such a method.

BACKGROUND

Ongoing development of 3D printing, methods and systems (more broadly referred to as additive manufacturing) is amongst others directed at increasing the throughput as well as the quality of the output of such systems. As may be appreciated, these two objectives work in many cases against each other, in that measures that are taken in order to improve the quality of the output in many cases negatively affect the printing rate and thereby the throughput. Recent developments, however, move the technique towards mass customization, for which high-throughput and first time right manufacturing are important.

A class of existing additive manufacturing systems is based on beam exposure to locally heat a part of the material to create a voxel. These systems and methods include for example powder bed fusion and selective laser annealing (SLA) type of processes, although these are merely examples of specific methods. Powder bed fusion, for example, is a method to fuse material particles together via energy absorption. In a typical embodiment, a focused laser beam heats the layer of deposited material such that particles fuse together via sintering or particles melt together via a so-called melt pool. Materials that can be processed with such methods include plastics, metals, ceramics. In another embodiment, an electron or ion beam is used to provide the necessary heat to sinter or fuse particles or material parts together to create voxels. In all cases the temperature time profile is a determining parameter for the quality of the created voxel. In these processes, defects might occur because of deviations in the imposed temperature-time profiles. These defects lead to unpredictable mechanical performance of the final part or product.

Another typical problem is that with the ongoing increase of the printing rate, the exposure time provided for each layer to cure becomes more and more optimized. This may result in most parts of an object layer to be sufficiently cured in the process, while certain parts have not been cured sufficiently. For example, if an object is printed by curing each object layer voxel-by-voxel, some voxels that are adjacent neighboring voxels on all sides (e.g. voxels located completely within an object) will exchange heat with all these neighboring voxels. Other voxels, for example voxels located at extremities of the object, or adjacent to un-sintered or uncured parts, may be neighboring to only one or two further voxels with which they may exchange heat. Thus in the latter voxels, heat provided via exposure to radiation will be more efficiently applied for curing the building material locally as compared to the former type of (interior) voxels of the object. Hence, as will be understood, better optimization of the required radiation dose per voxel will cause many voxels to have received a sufficient radiation dose for curing, while some voxels are left badly cured. Thus the end-product will suffer from small defects.

SUMMARY OF THE INVENTION

It is an object of the present invention to provide a method and system for layerwise production of a tangible object, wherein the abovementioned disadvantages of the prior art are obviated and which allows to produce the object in a fast manner while providing an excellent quality end-product.

To this end, there is provided herewith a method for layerwise production of a tangible object, the method comprising: providing a layer of building material onto a carrier; and repeatedly performing method cycles, each method cycle comprising the steps of: providing layer data corresponding to a layer of the tangible object; selectively exposing, using radiation from at least one radiation source, the layer of building material based on the layer data, for phase changing the building material for forming the layer of the tangible object; and providing a next layer of building material, said next layer being provided consecutive to the selectively exposed preceding layer, for selective exposure thereof during a subsequent method cycle; wherein one or more method cycles further comprises a step of verifying, using a sensor unit, the selectively exposed layer for identifying, within the layer of the tangible object formed in accordance with the layer data, regions of insufficiently irradiated building material; and wherein the method further comprises, after the step of verifying, during the method cycle wherein said verifying is performed or the subsequent method cycle, a step of adapting a radiation dose of the radiation for exposing one or more locations in said building material dependent on whether or not said one or more locations to be exposed for which the radiation dose is to be adapted are contiguous to one or more of the identified regions of insufficiently irradiated building material for compensating the radiation received in said regions.

The present invention enables to control the imposed temperature-time profiles, by indirect or direct measurement of the temperature-time profiles (for instance via melt-pool monitoring), by laser power control, or other means. This enables to repair of the imposed temperature-profiles by superposition of temperature profiles, by consecutive laser exposure.

The invention is based on the perception that, to prevent or resolve defects, it is desired to control the temperature-time profiles during build of a part. A small variation in output laser or a small shift in laser pulse leads to variation in the imposed temperature-time of the material/voxel. Also variation in absorption characteristics (particle size distributions, particle bed, density variation of the resin, etc) and heat conducting performance of the layer might cause variation in the imposed temperature profiles.

Defects caused by insufficient curing or heating of certain voxels, may conveniently be corrected by increasing the radiation dose of an adjacent voxel or that of the voxel in the layer that is directly on top of the 'defective' voxel. By increasing the radiation sufficiently, this radiation will be able to post-cure or post-heat the defective voxel underneath or adjacent to the new voxel to be cured, while simultaneously curing this new voxel. In accordance with the invention, this dose is only increased in locations wherein the next layer overlays an insufficiently cured region. Apart from the fact that this ensures efficient use of radiation energy during the process, this also prevents excess radiation to cause damage in areas outside the defective regions. To this end, the method applies a sensor unit to verify the selectively exposed layer for identifying, within the layer of the tangible object formed in accordance with the layer data, these regions of insufficiently cured or heated building material. The sensor unit may be performed on the exposed layer as a whole, prior to a next layer to be cured, or on a voxel-by-voxel or line-by-line basis to allow the adapting of radiation of adjacent or overlaying voxels.

The sensor unit applied may be a sensor unit of various possible types. For example, the sensor unit may comprise a thermal imaging camera to take an image of the selectively exposed layer to identify colder and warmer regions within the layer. The colder regions may indicate the regions that may be insufficiently cured. Other methods to detect these insufficiently cured or heated regions may include acoustic means (sound waves) or microwaves or X-ray. The sensor unit may enable to locate such regions of insufficiently cured or heated building material having sizes of up to 1 micrometer. Alternatively, the layer data of the layer of the tangible object may be analyzed to identify candidate regions.

The method of the present invention corrects the defects during the same or a subsequent method cycle, and therefore no time is lost in having to perform an additional correction step. When the temperature of exposed voxels are immediately monitored upon (or even during) exposure of a voxel or very shortly thereafter, the radiation dose may conveniently already be adapted for adjacent voxels that are yet to be exposed. Moreover, even if monitoring would be performed later, or maybe for the whole exposed layer at the end of the selective exposure step of a method cycle, the correction may be performed during exposure of a next layer.

To this end, in accordance with some embodiments, the step of adapting the radiation dose for the one or more locations is performed wherein in said subsequent method cycle, during said step of selective exposing of the next layer of uncured building material, for exposing the one or more locations with the adapted a radiation dose of the radiation for exposing said uncured building material is adapted dependent on whether or not thea locations to be exposed in accordance with the layer data coincides with one of the identified regions of insufficiently heated building material in the preceding layer.

In accordance with some embodiments, the step of adapting the radiation dose for the one or more locations comprises selecting one or more additional locations for irradiation and determining a radiation dose for the one or more additional locations. For example, in case voxels have been selected for irradiation based on the layer data received, instead of or in addition to adapting the radiation dose of contiguous voxels, additional voxels for irradiation may be added in case the verification step reveals regions that are insufficiently cured.

In accordance with some further embodiments, each method cycle further includes a step of providing write strategy data based on an outcome of said step of verifying, wherein the write strategy data at least provides the radiation dose for each location to be exposed during the selective exposing step of the subsequent method cycle. The radiation dose may be adapted in the method in multiple different ways, for example, adapting of the radiation dose may in accordance with some embodiments be performed by setting at least one of a group comprising the radiation intensity, the duration of a radiation pulse, the radiation power, the scanning speed of the radiation source, the radiation wavelength or wavelength spectrum. Regardless of any other content or the exact data format of the write strategy data, this write strategy data may comprise data that directly allows controlling any of the above parameters for adapting the radiation dose.

Although any type of manufacturing system may be applied for carrying out the method, in accordance with one possible implementation of the method in accordance with the invention, the step of selective exposure includes moving the radiation source relative to the layer of uncured building material, and the radiation source is at least one of a group comprising: a laser unit providing a laser beam, a pulsed laser providing laser pulses for impinging on the layer of new building material, a plurality of laser units for providing a plurality of laser beams, at least one laser unit and a beam splitter unit for providing a plurality of beams, a plurality of individually addressable laser sources, one or more laser diodes or an array of laser diodes. Laser beams are, as may be appreciated, to a large extent suitable to allow illumination of a single voxel in the layer exposed. The application of laser beam may thus be suitably applied in a method wherein the selective exposure is performed voxel-by-voxel in accordance with the layer data provided.

Scanning of the radiation source, e.g. a laser source, across the surface of the building material may be performed in a large number of different manners known or available to the skilled person. In some specific embodiments, the laser beam may be directed towards the layer of building material to be cured via a rotating polygon prism. The exposure head of such embodiments make use of Snell's law (also known as Snell-Descartes law or law of refraction) for enabling the one or more light beams of the exposure head to be scanned across the surface of the layer to be illuminated during selective exposure. These embodiments use the rotating polygon prism as a transmissive element wherein at least one facet of the element receives the one or more light beams, and wherein at least one other facet outputs the received one or more light beams after the light beams have traveled through the transmissive element. By rotating the transmissive element, the orientation of the receiving facet with respect to the incident one or more beams changes constantly. Therefore, the output angles of the light beams leaving the transmissive element change due to the rotation, allowing scanning of the beams in a reciprocating manner. This principle may be used in combination with a relative linear motion of the rotating polygon prism relative to the layer to be cured, to enable selective exposure of the complete layer.

In accordance with some embodiments, in each method cycle the step of selectively exposing the layer of new building material comprises: performing a plurality of selective exposure sub-steps, using the radiation from the at least one radiation source, of the layer of new building material based on the layer data, wherein each of said selective exposure sub-steps is performed with radiation at a radiation power associated with said respective sub-step.

In particular, in accordance with some specific embodiments, the building material comprises a resin including particles of a further building material embedded in the resin, and in each method cycle the step of selectively exposing the layer of uncured building material comprises: performing a first selective exposure, using the radiation from the at least radiation source, of the layer of uncured building material based on the layer data, for photo-curing of the building material, wherein said first selective exposure is performed with the radiation at a first radiation power; and performing a second selective exposure, using the radiation from the at least one radiation source, of the layer of photo-cured building material based on the layer data, for performing de-binding of the resin from the further material, wherein said second selective exposure is performed with the radiation at a second radiation power; wherein the second radiation power is larger than the first radiation power.

The above embodiment may for example advantageously be applied in a selective laser exposure process to perform the de-binding of the resin from the melt or sinter material (e.g. a ceramic or a metal) in a voxel-by-voxel manner directly after the photo-curing step. Considering for example selective laser annealing (SLA) based added manufacturing methods, such methods are based on selective layer-by-layer photo-polymerization of a resin layer to create a 3D printed part. In conventional methods, the uncured resin is typically removed after completion of the printing process to reveal the required 3D part. The resin is then used as a carrier to create a 3D printed part. Subsequent temperature steps are used to remove the resin from the 3D part (de-binding) and to fuse the particles of the build material together (sintering). Ceramics and metals can be made with this method. However, key challenge is shrinkage, to control dimensional stability and to avoid crack-formation. The above embodiments of the invention, wherein de-binding may be performed voxel-by-voxel, prevent a post processing step of the tangible object after completion of the method, such as used in conventional SLA processes. Such a post-processing step, wherein the tangible object that has been created is heated to perform the de-binding and outgassing of the resin, results in the object to slightly shrink. As a result, cracks may be formed in the object during post processing.

In another embodiment, the building material consists of particles with predefined size distribution. In each method cycle the step of selectively exposing the layer of new building material comprises: performing a first selective exposure, using the radiation from at least one radiation source, of the layer of new building material based on the layer data, for selective sintering of the building material, wherein said first selective exposure is performed with the radiation at a first radiation power; and performing a second selective exposure, using the radiation from the at least one radiation source, of the layer of new building material based on the layer data, for performing further sintering of the build material, wherein said second selective exposure is performed with the radiation at a second radiation power; wherein the second radiation power is larger than the first radiation power.

In the present embodiment, by performing the de-binding in a voxel-by-voxel manner during the manufacturing process of the tangible object, the post-processing step and the resulting shrinkage of the end-product can be prevented. By performing the de-binding immediately for each voxel after photo-curing of the resin, the voxel itself may slightly shrink, but not the whole product. Thus cracking is prevented, and even better, the per-voxel shrinkage during the de-binding can be compensated for during the process.

It is specifically noted, that the above embodiments that allow de-binding of resin in a voxel-by-voxel manner do not necessarily have to be performed together with the step of verifying the exposed layer to identify insufficiently cured regions. It is also not required with this embodiment to perform the adapting of the radiation dose accordingly. The method of this embodiment can be applied without these two steps. However, it is also noted that these two steps do improve the quality of the end-product as explained hereinabove. Moreover, an additional verification step would likewise allow for verification of the cured and de-bind layer for thickness variations as a result of shrinkage of voxels during de-binding, and therefore allow compensation.

In it's broadest, most general sense, the method of the above embodiment without the verification step and adaptation of the radiation dose, could be defined as follows, providing a further aspect of the present invention. A method for layerwise production of a tangible object, the method comprising: providing a layer of uncured building material onto a carrier; and repeatedly performing method cycles, each method cycle comprising the steps of: providing layer data corresponding to a layer of the tangible object; selectively exposing, using radiation from at least one radiation source, the layer of uncured building material based on the layer data, for curing the building material for forming the layer of the tangible object; and providing a next layer of uncured building material, said next layer being provided consecutive to the selectively exposed preceding layer, for selective exposure thereof during a subsequent method cycle; wherein the building material comprises a resin including particles of a further building material embedded in the resin, and wherein in each method cycle the step of selectively exposing the layer of uncured building material comprises: performing a first selective exposure, using the radiation from the at least radiation source, of the layer of uncured building material based on the layer data, for photo-curing of the building material, wherein said first selective exposure is performed with the radiation at a first radiation power; and performing a second selective exposure, using the radiation from the at least one radiation source, of the layer of photo-cured building material based on the layer data, for performing de-binding of the resin from the further material, wherein said second selective exposure is performed with the radiation at a second radiation power; wherein the second radiation power is larger than the first radiation power.

In accordance with a second aspect of the invention, there is provided an apparatus for layerwise production of a tangible object, comprising a carrier, a layer deposition unit for providing a layer of uncured building material to the carrier, a controller, an exposure device comprising at least one radiation source, and a scanner actuator for moving the carrier and the exposure device relative to each other, wherein the control unit is arranged for providing layer data corresponding to a layer of the tangible object, and wherein the exposure device is communicatively connected with the control unit for receiving the layer data, and wherein the exposure device cooperates with the scanner actuator for selectively exposing, using radiation from at least one radiation source, the layer of uncured building material based on the layer data, for curing the building material for forming the layer of the tangible object; and wherein the control unit is further arranged for repeatedly performing method cycles, each method cycle comprising the steps of: providing the layer data, controlling the exposure device and the scanner actuator for performing the selective exposing, and activating the layer deposition unit for providing a next layer of uncured building material onto the selectively exposed preceding layer; wherein the apparatus further comprises a sensor unit for verifying the selectively exposed preceding layer for identifying, within the layer of the tangible object formed in accordance with the layer data, regions of insufficiently cured building material; and wherein the control unit is further arranged for adapting a radiation dose of the radiation for exposing the uncured building material of the next layer dependent on whether or not a location to be exposed in accordance with the layer data of the next layer coincides with one of the identified regions of insufficiently cured building material in the preceding layer.

In some embodiments, the radiation source is at least one of a group comprising: a laser unit providing a laser beam, a pulsed laser providing laser pulses for impinging on the layer of uncured building material, a plurality of laser units for providing a plurality of beams, at least one laser unit and a beam splitter unit for providing a plurality of beams. In case the radiation source comprises a laser unit for providing a laser beam, in some embodiments, the exposure device further comprises a rotatable polygon prism for scanning the laser beam in a reciprocal motion.

In accordance with some specific embodiments, the layer deposition unit is arranged for providing the building material comprising a resin including particles of a further material embedded in the resin, and wherein the radiation source comprises a first laser unit and a second laser unit, wherein the first laser unit is arranged for providing a laser beam at a first radiation power for photo-curing of the resin, and wherein the second laser unit is arranged for providing a laser beam at a second radiation power for de-binding of the resin from the further material, wherein the second radiation power is larger than the first radiation power. As explained above, this apparatus may be conveniently applied for performing selective laser melting (SLM) or selective laser sintering (SLS) to perform de-binding in a voxel-by-voxel manner during production of the object and to prevent a post-processing step.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
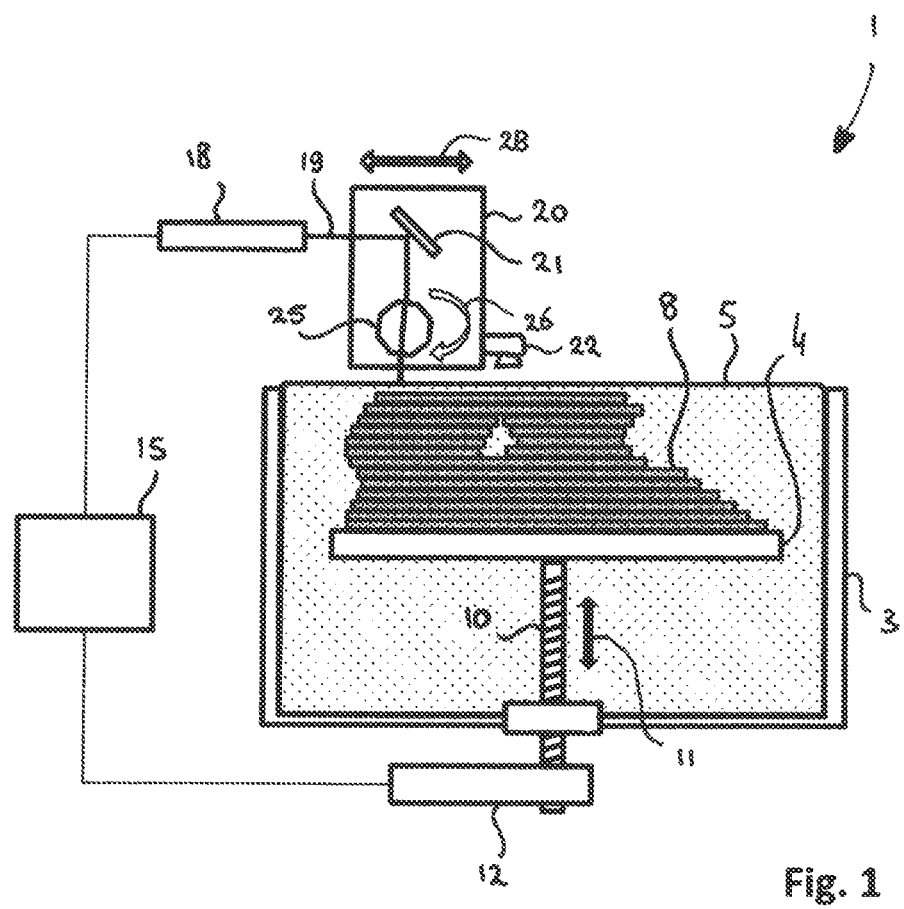
FIG. 1 schematically illustrates a rapid prototyping apparatus in accordance with embodiments of the present invention.

FIG. 1 schematically illustrates an apparatus 1 in accordance with an embodiment of the present invention for layerwise production of a tangible object 8. The apparatus 1 consists of a container 3 which is open on an upper side thereof. Within the container 3, a translatable carrier platform 4 can be moved in a vertical (z) direction up and down by means of an actuator 12 driving a rotatable axis 10. The direction (z) wherein the carrier platform 4 can be translated is indicated by double arrow 11.

In use, the tangible object 8 is produced on the carrier platform 4 layer for layer. To this end, the container 3 is filled with a building material 5. The building material 5 may be a liquid or powder which may be cured by applying a sufficient amount of energy to it. For example, the building material 5 may comprise a resin that may be cured by illumination with optical radiation. In order to cure such a resin, sufficient amount of optical energy must be locally added to cure a voxel of the resin. This may for example be applied by means of an optical beam such as a laser beam of optical radiation of a suitable wavelength, intensity and/or duration. The total amount of energy, or radiation dose required to cure the building material 5 is dependent on the type of building material. As may be appreciated, to apply a sufficient radiation dose for curing a voxel of building material 5, the duration of an optical pulse, the intensity of the laser beam, and/or the wavelength of the radiation may be varied typically.

The building material 5 may comprise further building materials such as a metal or ceramic material in powder form. For example, the building material 5 may be a suspension of a resin and a further building material in powder form. Metal powder may for example be mixed with a resin homogeneously, and with a sufficient density of metal powder within the resin. This allows the layerwise production of metal objects by fusing, sintering or melting the metal powder within the resin, and removing the resin residue.

FIG. 1 only shows the container 3 comprising the building material 5 and the carrier platform 4 therein. FIG. 1 does not show an applicator arrangement for providing the building material 5 to the container 3. As may be appreciated to produce the object 8 layer by layer, the carrier platform 4 is moved downward after the creation of each consecutive layer of the object 8. By moving the platform 4 downward across the height of one layer, the object 8 to be produced is slowly submerged within the curable building material 5, which may be of liquid type. To allow the building of a further layer, dependent on the viscosity of the building material 5, it may be necessary to apply an applicator (not shown) to apply the building material 5 on top of the previously built layer of the object 8 forming a liquid layer of building material having a uniform thickness.

As illustrated in FIG. 1, the apparatus 1 further comprises an exposure system 20 and an optical radiation source 18 to allow selective exposure of the building material 5 for forming the layers of the object 8. The optical radiation source 18 in the apparatus 1 of FIG. 1 is a laser unit 18 providing a laser beam 19 to the exposure head 20. The exposure head 20 comprises a mirror 21 which reflects the laser beam 19 onto a rotatable polygon prism 25. The rotatable polygon prism 25 may for example be rotated in the direction indicated by arrow 26. FIG. 1 is a schematic drawing, and the exact orientation and arrangement of the rotatable polygon prism 25 relative to the carrier platform 4 or the object 8 to be formed may be carefully selected to yield the desired exposure pattern on the surface of the building material 5. By rotating the polygon prism 25, as a result of Snell's law, the laser beam 19 will be scanned across the surface of the building material 5 over a small distance, and restart its scanning path again upon impinging on a new facet of the polygon prism. By moving the exposure system 20 relative to the surface of the building material 5 across the distance of the layer to be formed, the building material 5 will be illuminated by the laser beam in a plurality of adjacent scan lines of the beam 19 impinging on the surface. This will schematically be illustrated in FIG. 3, which is discussed further down below. To perform the scanning across the surface of the building material 5, the exposure head 20 can be moved in the directions parallel to the surface, for example as indicated by double arrow 28 in FIG. 1.

The exposure head 20 further comprises a sensor unit 22. Sensor unit 22 enables to verify whatever illuminated parts of the build material 5 are sufficiently curved. This allows detection of defects.

The operation of the actuator 12 for moving the carrier platform 4 up and down, and the operation of the laser unit 18 as well as the exposure system 20, including all of the actuators for moving these parts relative to the each other or for rotating them, may be controlled by means of a control system 15. For example, operation of the laser unit 18 and the actuator for moving the exposure head 20, as well as operation of the rotation speed of the polygon prism 25, may be carefully controlled by the control unit to provide the desired illumination pattern on the surface of the building material 5 for forming a next layer of the tangible object 8 during a selective exposure step. The control system 15 further receives the sensor signal from sensor unit 22.

Figure 2:
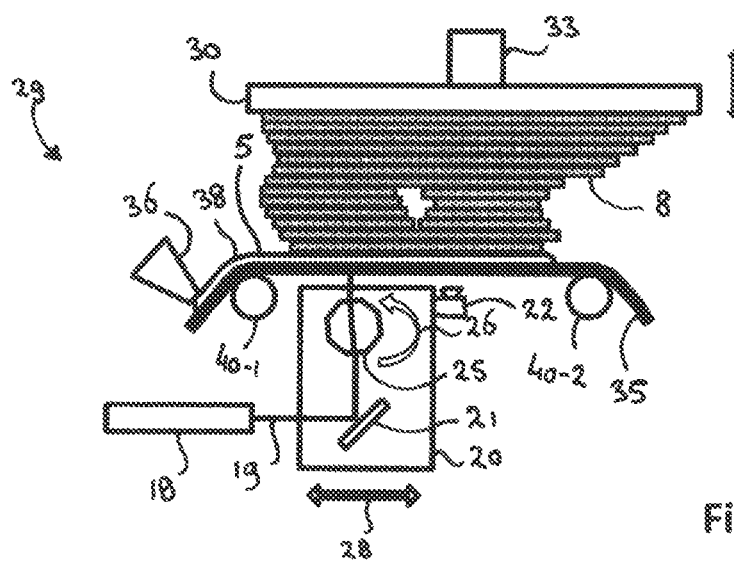
FIG. 2 illustrates a rapid prototyping apparatus in accordance with a further embodiment of the present invention.

FIG. 2 illustrates an alternative apparatus 29 for layerwise production of a tangible object. In the apparatus of FIG. 2, layers of the tangible object 8 are attached to a movable carrier platform 30 from which the object 8 to be produced suspends during production. The carrier platform 30 can be moved up and down by means of an actuator 33. An applicator 36 applies a layer 38 of building material to a flexible sheet 35 that can be moved underneath the tangible object 8 by means of rollers 40-1 and 40-2. The platform 30, during movement of the layer 38 underneath the object 8, can be moved slightly upwards to prevent contact of the layer 38 with the previous layer of the tangible object 8 during motion of the layer 38. The flexible sheet 35 may for example be transparent, or at least transparent to the radiation wavelength of the laser beam 19 provided by laser unit 18. Again, during selective exposure of the building material 5 in layer 38, the laser beam 19 is reflected by the mirror 21 through a rotatable polygon prism 25. By moving the exposure head 20 in the directions indicated by arrow 28, a scanning motion across the surface of the layer to be produced allows selective exposure in accordance with a desired exposure pattern.

Figure 3:
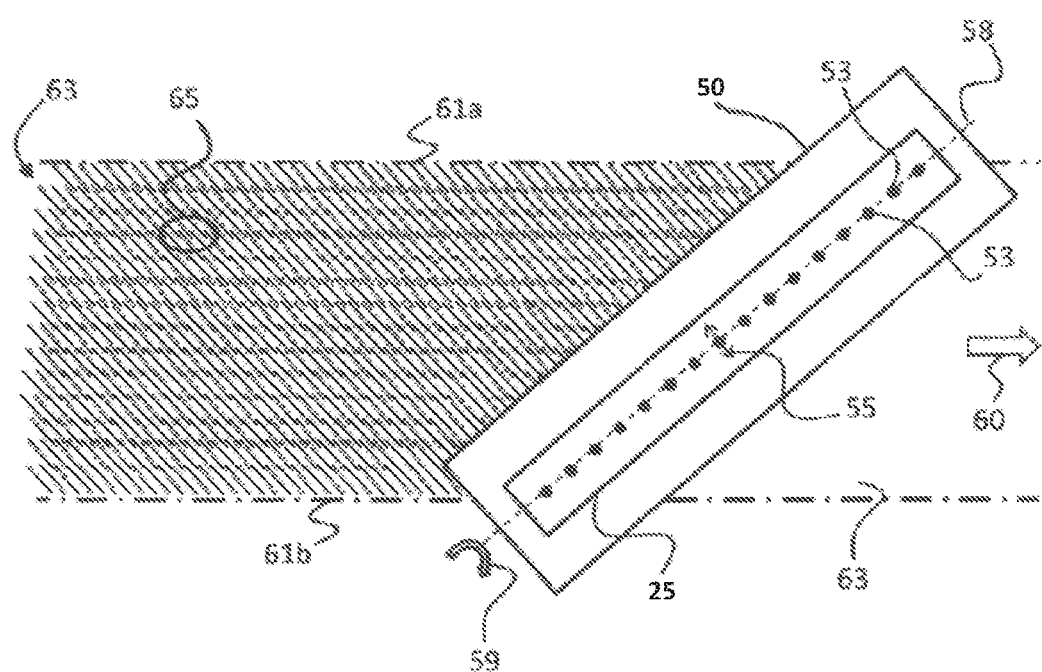
FIG. 3 schematically illustrates an exposure head for use with a method and apparatus in accordance with the present invention.

FIG. 3 schematically illustrates an exposure head 50 in accordance with the present invention which is moved in the direction indicated by arrow 60 above the surface of the build material 63. The exposure head 50 comprises a plurality of laser diodes 53 (only some of which have been indicated with that reference numeral 53 such as to not unnecessary complicate the figure). The exposure head 50 further comprises a rotatable polygon prism 25 of which the axis of rotation is schematically indicated by dotted line 58. The direction of rotation is indicated by arrow 59. Due to the rotation of the rotatable polygon prism 25, the impingement spots that the light coming from laser diodes 53 will create on the surface of the build material 63 will be scanned in the directions indicated by arrow 55. Dotted lines 61a and 61b schematically illustrate the borders of the area that can be illuminated using exposure head 50 while moving in the direction indicated by arrow 60 above the build material surface 63.

In FIG. 3, the exposure head 50 is illustrated in the position wherein it has moved in the direction indicated by arrow 60 above the build material surface 63. As can be seen, behind the exposure head 50 the impingement spots of the laser diodes 53 of the exposure head 50 have exposed the surface of the build material 63 across a multitude of line sections schematically indicated by reference numeral 65. The line sections 65 partly overlap at their end points as indicated. This overlapping may be performed intentionally, but it is also possible to perform illumination of the surface without overlapping of the line sections by switching the laser diodes 53 on and off in a controlled manner with control unit 15.

Figure 4A:
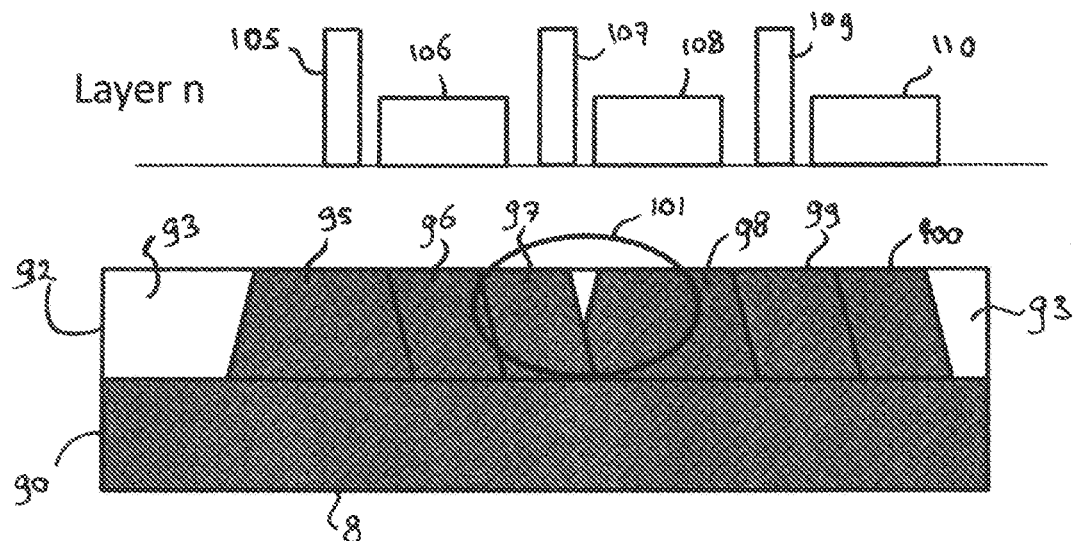
FIGS. 4a and 4b illustrate a method in accordance with a first embodiment of the present invention.
Figure 4B:
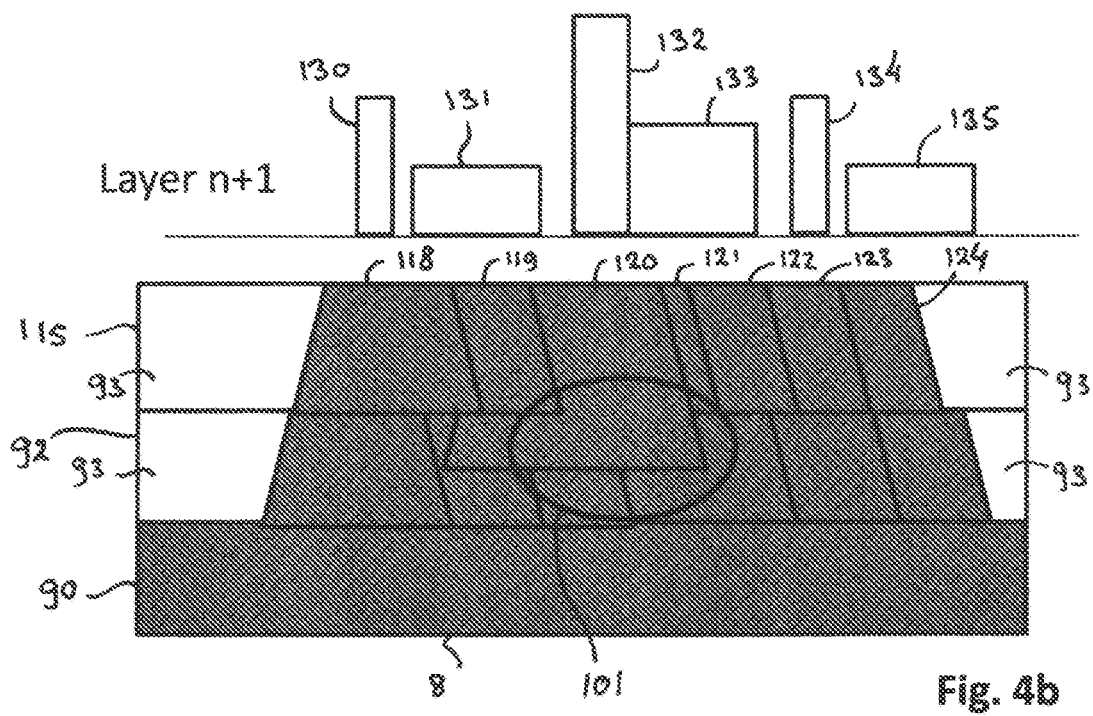

FIGS. 4a and 4b schematically illustrates a method of the present invention for layerwise production of a tangible object. The FIGS. 4a and 4b only illustrate the building of two consecutive layers of the tangible object 8. A method of layerwise production of the tangible object 8 starts with depositing the first layer of uncured building material 5 onto a carrier, such as the carrier platform 4 of FIG. 1. The building material 5 may for example be applied using an applicator (not shown in FIG. 1). Then, the method continues by repeatedly performing method cycles, wherein a layer of the tangible object 8 to be formed is created during each method cycle. FIG. 4a illustrates an already cured layer 90 of the tangible object 8. On top of this cured layer 90 of the object 8, liquid building material in the form of a resin 93 is applied in a layer 92. The layer 92 will be selectively illuminated for curing of the liquid resin 93. To this end, the layer 92 of building material, i.e. resin 93, will be selectively exposed in a plurality of locations or voxels 95, 96, 97, 98, 99 and 100. Each method cycle starts with the providing of layer data to the controller 15 of the system indicating for example the voxels to be exposed for the respective layer to be formed during the cycle. The layer data may for example typically be a bit map of the layer indicating the locations of the voxels 95-100 to be illuminated. Additional information may be available for each voxel dependent on the exact implementation of the method of the present invention. For example, as will be explained further down below, this additional information may comprise an indication of the energy dose (or duration, intensity or wave length of the radiation). However, such data may also be provided separate from the layer data.

Each method cycle further comprises a step of selective exposing of the layer of uncured building material 5 (i.e. the resin 93) based on the provided layer data. The selective exposing will be performed for curing the building material in each voxel 95-100 indicated by the layer data for forming of the layer of the tangible object 8. As will be appreciated, although ideally the voxels 95-100 will have a cubical shape, this is difficult to control in practice because the amount of energy absorbed by the building material in the voxel is dependent on whether this building material is located close to the surface or close to the previous layer 90. The differences, for example in heat transfer, between voxels may result in some voxels (such as voxel 95) to be well cured to provide a sufficient hardness, while other voxels (e.g. indicated within circle 101), are partly uncured or not sufficiently cured. The area indicated within circle 101 is therefore a defect in the layer 92, wherein the resin 93 is insufficiently cured.

Next step within each cycle is the providing of a next layer of uncured building material on top of the preceding layer. The next layer 115 is illustrated in FIG. 4b consisting of liquid resin 93. The next layer of the tangible object 8 will be formed by selectively curing the layer 115 of building material in a plurality of voxels 118, 119, 120, 121, 122, 123 and 124 as illustrated in FIG. 4b. However, in order to compensate for defects such as defect 101 illustrated in FIG. 4a, a sensor unit 22 may be applied on the exposure head 20, which verifies the selectively exposed preceding layer behind the polygon prism 25 to identify regions of insufficiently cured building material. For example the sensor unit 22 may be a heat image camera that records the temperature of the material after exposure and identifies cold regions in the exposed layer. These cold regions may for example be compared with the layer data received for the respective layer to identify those regions that should have been exposed, and which apparently have not received a sufficient dose radiation energy to cure them sufficiently. The data about the regions of insufficiently cured building material will be provided to the control unit 15. The control unit 15 may provide write strategy data for the next layer to be build, such as to allow correction of the defects, such as defect 101, during selective exposure of the next layer of the object 8 to be created. For example, in the illustration of FIG. 4b, the write strategy data may indicate that a larger energy dose is to be provided for the exposure of voxel 120 as compared to the voxels 119 and 121.

In FIGS. 4a and 4b, the schematic graph about each of the figures schematically indicates the intensity and the duration of laser pulses used for curing each of the voxels. For example, in FIG. 4a, each voxel, such as voxel 95-100, is illuminated by two consecutive laser pulses, one of short duration and high intensity, such as pulse 105, 107 or 109, and one of long duration and lower intensity, such as pulse 106, 108 and 110. Although in the present example, each voxel 95, 96, 97, 98, 99 and 100 is illuminated by means of two laser pulses (e.g. 105 and 106), different embodiments may apply only a single laser pulse for each voxel to perform the curing. Whether or not a single laser pulse or multiple pulses are used for curing the voxels 95-100 may depend on the situation, such as the type of building material, whether or not the building material comprises a further building material, the chemical behavior of such material, etcetera. For example, if the resin 93 has embedded therein a metal or ceramic powder, the melting or fusing of the powder may be achieved first by means of a high energy pulse while consecutively a energy pulse with a lower energy may be used to debind and remove the resin from the further material.

In FIG. 4b, the pulses 130 and 131 may for example be used for illuminating voxel 119, the pulses 132 and 133 may be used for illuminating voxel 120, and the pulses 134 and 135 may be used for illuminating voxel 121. As follows from the schematic illustration of FIG. 4b, the energy dose provided to the building material during illumination of voxel 120 is much larger than the energy dose eradiated for illumination of voxels 119 and 121. As a result, curing of the voxel 120 is performed in a larger area, and with a larger penetration depth. Therefore, by illumination voxel 120 with a larger energy dose, the insufficiently cured region 101 in the preceding layer 92 can be corrected during illumination of the voxels 118-124 in the next layer 115. The additional energy provided for illumination of voxel 120 causes the building material in the defective area 101 to be further cured such as to correct for the defect 101.

The write strategy data provided by the control unit 15 may, to this end, optimize the energy dose used for illuminating each of the voxels of each layer. As may be appreciated, large defects (i.e. larger regions of insufficiently cured building material) are to be corrected with a larger energy dose than small defects. Therefore, an optimal energy dose may exist for each of the voxels 118-124 to be illuminated in the next layer 115 such as to optimally correct for any defects in the preceding layer 92. The write strategy data may be a separate data file, or may be included in the layer data that is provided for indicating the voxels to be illuminated in each method cycle. In case the write strategy data is a separate data file, such a data file may include bit mat data.

The energy dose may be controlled by controlling one or more of the radiation intensity, the duration of a radiation pulse, the radiation power, the radiation wavelength or the wavelength spectrum. The duration may be controlled by controlling a pulselength of a pulselaser, or by controlling the rotation speed of the polygon prism which determines how fast the laser beam is scanned across the surface. The laser unit 118 does not necessarily provide a pulsed laser beam 19, a similar effect may be obtained using a continues laser. However, by using a pulsed laser, the pulse length and energy dose provided may be better controlled by the control unit 15. The laser unit 18 is illustrated in FIGS. 1 and 2 as a single laser unit providing a single beam 19. It is to be understood that FIGS. 1 and 2 are only schematic, and instead of a single laser unit providing a single laser beam 19, the exposure head 20 may receive a plurality of laser beams arranged side by side. These laser beams may be provided using a single or multiple radiation sources, such as one or more laser sources and a splitter unit for splitting the laser beam into a plurality of beams, or an array of laser diodes providing a plurality of laser beams.

Figure 5A:
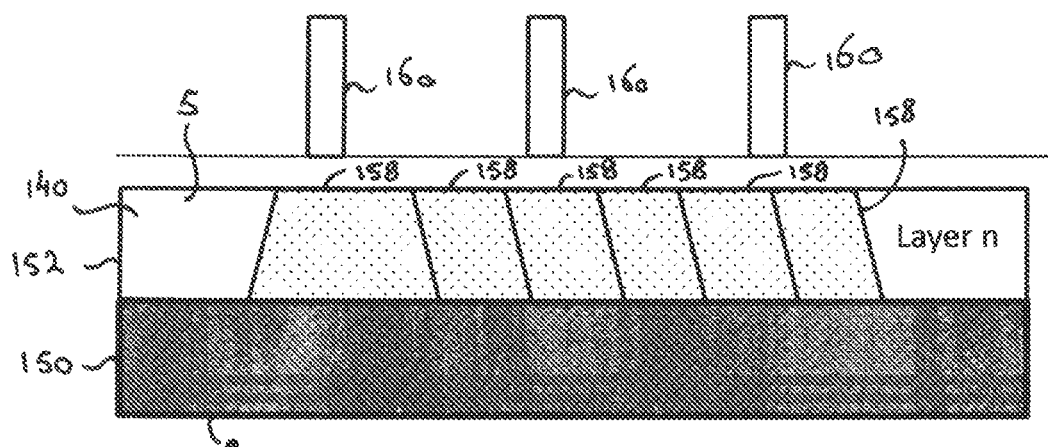
FIGS. 5a, 5b and 5c illustrate a method in accordance with a second embodiment of the present invention.
Figure 5B:
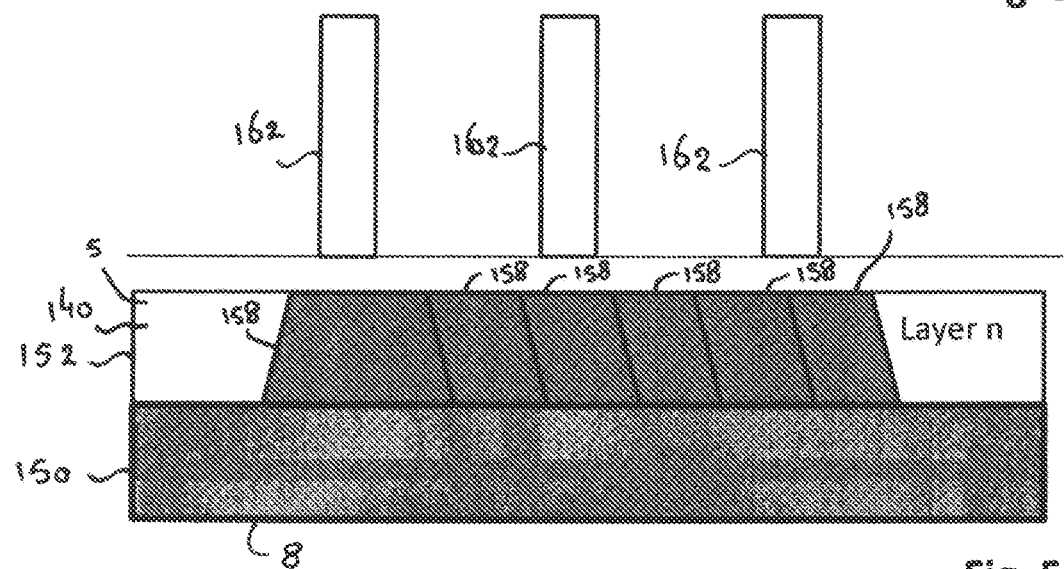
Figure 5C:
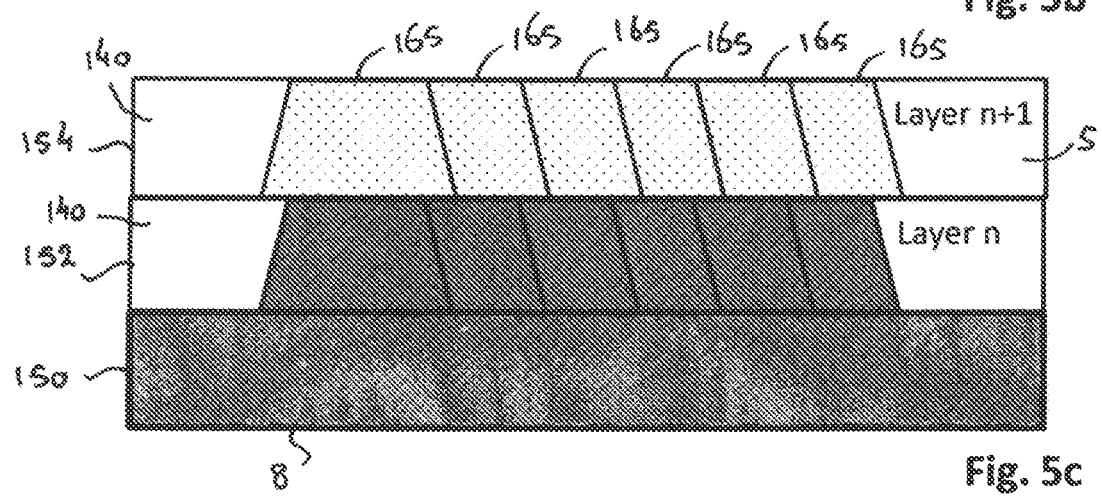

In a further embodiment of the present invention, illustrated in FIG. 5a, the building material 5 may be comprised of a resin 140 wherein a metal or ceramic powder is embedded. Such a building material may be applied for creating tangible objects 8 by fusing the metal or ceramic powder. The resin layer 140 may be applied on top of an already cured layer 150 of the object 8, or on a carrier platform 4 (see FIG. 1). This may be used for forming metal or ceramic objects. FIGS. 5a-c schematically illustrate the selective exposure steps performed during the method of the present invention in accordance with this embodiment. In FIG. 5a, the uncured resin 140 in voxels 158 is first photo-cured by means of radiation pulses 160 of a first energy dose. For example, the laser pulses 160 may be of low intensity and short duration, sufficient for photocuring of the resin material thereby fixing the voxels in place as indicated by the layer data provided. A second selective exposure step is performed using laser pulses 162 of high energy and longer duration, i.e. providing a higher energy dose. During this second selective exposure, the voxels 158 are again illuminated for melting or fusing the ceramic or metal material therein, and for performing de-binding the resin from the cured further material. As may be appreciated, instead of helping this method may be applied for sintering the powder type further material to provide an object 8 with increased hardness.

During a further cycle illustrated in FIG. 5c, a next layer of building material 154 provided on top of the preceding layer 152 is illuminated in voxels 165 to photo-cure the resin in layer n+1.

The first and second exposure steps may be implemented by scanning the exposure head 20 relative to the surface of the building material in two consecutive substeps, illuminating at different intensities with the laser beam. Alternatively, multiple laser sources, or a beam splitter or the like, may be used to provide two beams that are directed through the polygon prism to be scanned across the surface one after the other. As will be appreciated the latter implementation of the method of the present invention allows to much faster perform this method of curing.

The method illustrated in FIGS. 5a-c consisting of two consecutive selective exposure steps, allows to perform the debinding of the resin from the building material in each layer in a voxel by voxel manner. This allows to perform the de-binding during leoised projection of the tangible object. Conventionally, where the de-binding is performed as a separate step after the tangible object has been created, causes the tangible object to shrink slightly, resulting in cracks and defects in the tangible object. This can be prevented effectively by using the voxel-by-voxel manner illustrated in FIGS. 5a-c.

The operation principle of the rotating polygon prism may be understood as follows. The exposure head of such embodiments make use of Snell's law (also known as Snell-Descartes law or law of refraction) for enabling the one or more light beams of the exposure head to be scanned across the surface of the layer to be illuminated during selective exposure. Snell's law defines the relation between the angle of incidence θ1 and the angle of refraction θ2 of the light beam relative to the normal at an interface surface, when the light beam travels from a first medium (e.g. air) into a second medium (e.g. glass) through the interface surface. According to Snell's law, the incident light beam reflects towards the normal vector of the interface surface when going from a medium having a smaller index of refraction n1 to a medium having a larger index of refraction n2. Inversely, when the light beam travels from a medium having a larger index of refraction n2 towards a medium having a smaller index of refraction n1, the light beam refracts at the interface surface to a direction more away from the normal vector. Mathematically, in terms of the angles of incidence θ1 and angle of refraction θ2 the relation between the angles is as follows:

$$\sin(\theta 1)/\sin(\theta 2) = n2/n1$$

In view of the above, the described embodiments use the rotating polygon prism as a transmissive element wherein at least one facet of the element receives the one or more light beams, and wherein at least one other facet outputs the received one or more light beams after the light beams have traveled through the transmissive element. By rotating the transmissive element, the orientation of the receiving facet with respect to the incident one or more beams changes constantly. With reference to Snell's law above, the angles of the refracted light beams travelling internally within the transmissive element, relative to the normal vector of the interface surface provided by the facet, will change as a result of the rotation of the facet relative to the one or more beams. Inversely, at the facet forming the output of the transmissive element the indices of refraction of the two media at either side of the interface surface are reversed. Therefore, since the whole transmissive element rotates relative to the one or more light beams, the output angles of the light beams leaving the transmissive element relative to the normal vector to the interface surface change in opposite direction due to the rotation. Thus, by using a transmissive element in the path of the one or more light beams from one or more light sources, and rotating the transmissive element at least partially around a (notional or physical) axis of rotation (such that the orientation of the receiving and outputting facets relative to the light beams changes due to the rotation), the direction of the light beams can be changed and the light beams can thereby be scanned across the surface of the substrate. This principle may be used in combination with a relative linear motion of the rotating polygon prism relative to the layer to be cured, to enable selective exposure of the complete layer.

As mentioned herein above, the invention is not limited to any specific scanning method or a type of exposure head, or whether or not such an exposure head comprises or makes use of a rotatable polygon prism. Many alternative scanning and exposure methods and systems are known to the skilled person which may well be applied to implement the present invention. For example, other exposure systems use moving or rotating mirrors or some type of actuator system cooperating with the radiation source. Some further systems are based on scanning of the sample or object to be built instead of, or in addition to scanning of the beam. The skilled person may recognize alternative scanning methods that may be applied.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Although this document in some instances refers to specific types of additive manufacturing methods to which the present invention may be applied, this is not to be understood as limiting on the field of application of the present invention. The teachings of the present document may be applied more broadly to additive manufacturing methods in general.

Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the

The invention claimed is:

1. A method for layerwise production of a tangible object, the method comprising:
   providing building material onto a carrier; and
   performing a method cycle multiple times to form the tangible object, wherein performing the method cycle comprises:
      providing a layer data corresponding to a layer of the tangible object;
      phase changing the building material, based on the layer data, to form the layer of the tangible object by selectively exposing the building material to a radiation from a radiation source; and
      providing a next layer of the building material, said next layer being consecutively provided onto the building material selectively exposed during the phase changing preceding layer;
   wherein one or more of the method cycles further comprises verifying, using a sensor unit, the building material phase changed by selectively exposing the building material, to identify regions of insufficiently irradiated building material; and
   wherein the method further comprises, after the verifying, during the method cycle wherein the verifying is performed or a subsequent method cycle, adapting a radiation dose, from the radiation source for exposing a location in the building material, dependent on whether the location for which the radiation dose is to be adapted is contiguous to a region identified, during the verifying, as insufficiently irradiated building material for compensating the radiation received in said regions.

2. The method according to claim 1, wherein adapting the radiation dose is performed in a subsequent method cycle, during the selectively exposing of the building material in accordance with the layer data coinciding with an identified region having insufficiently heated building material in a preceding layer.

3. The method according to claim 1, wherein the adapting the radiation dose comprises selecting an additional location for irradiation and determining a radiation dose for the additional location.

4. The method according to claim 1, wherein each method cycle further includes:
   providing a write strategy data based on an outcome of the verifying, wherein the write strategy data provides the radiation dose for each location to be exposed during the selective exposing of a subsequent iteration of the method cycle.

5. The method according to claim 1, wherein adapting of the radiation dose comprises setting at least one of the group consisting of:
   a radiation intensity,
   a duration of a radiation pulse,
   a dwell time of the radiation source,
   a radiation power,
   a radiation wavelength, and
   a radiation wavelength spectrum.

6. The method according to claim 1, wherein selectively exposing of the building material includes moving the radiation source relative to the building material, wherein the radiation source is at least one of the group consisting of:
   a laser unit providing a laser beam,
   a pulsed laser providing laser pulses for impinging on the layer of building material,
   a plurality of laser units for providing a plurality of beams,
   at least one laser unit and a beam splitter unit for providing a plurality of beams,
   one or more laser diodes, and
   an array of laser diodes.

7. The method according to claim 1, wherein the method cycle the selectively exposing of the building material comprises:
   performing a plurality of selective exposure sub-steps, using the radiation from the radiation source, of a layer of uncured building material based on the layer data, wherein each of said selective exposure sub-steps is performed with radiation at a radiation power associated with said respective sub-step.

8. The method according to claim 1, wherein the building material comprises a resin including particles of a further building material embedded in the resin, and
   wherein the selectively exposing the building material comprises:
      performing a first selective exposure, using the radiation from the radiation source, of the building material based on the layer data, for photo-curing of the building material, wherein said first selective exposure is performed with the radiation at a first radiation power;
      performing a second selective exposure, using the radiation from the radiation source, of the building material photo-cured during the first selective exposure, based on the layer data, for performing debinding of the resin from the further material, wherein said second selective exposure is performed with the radiation at a second radiation power;
      wherein the second radiation power is larger than the first radiation power.

9. An apparatus for layerwise production of a tangible object, the apparatus comprising:
   a carrier,
   a layer deposition unit for providing a layer of building material to the carrier,
   a controller,
   an exposure device comprising:
      a radiation source, and
      a scanner actuator for moving the carrier and the exposure device relative to each other,
   wherein the control unit is arranged for providing a layer data corresponding to a layer of the tangible object, and
   wherein the exposure device is communicatively connected with the control unit for receiving the layer data, and
   wherein the exposure device cooperates with the scanner actuator for selectively exposing, using radiation from the radiation source, the building material based on the layer data, for curing the building material to form a layer of the tangible object; and
   wherein the control unit is further arranged for performing a method cycle multiple times, wherein performing the method cycle comprises:
      providing the layer data,
      controlling the exposure device and the scanner actuator to selectively expose the building material to the radiation from the radiation source to cause a phase changing of the building material to form the layer of the tangible object, and activating the layer deposition unit for providing a next layer of uncured building material onto the selectively exposed building material forming the layer of the tangible object;

wherein the apparatus is further configured to perform, during one or more of the method cycles, a verifying, using a sensor unit, the building material phase changed by selectively exposing the building material, to identify regions of insufficiently irradiated building material; and wherein the control unit is further arranged for, after the verifying, during the method cycle wherein the verifying is performed or a subsequent method cycle, adapting a radiation dose from the radiation source for exposing a location in the building material, dependent on whether the location for which the radiation dose is to be adapted is contiguous to a region identified, during the verifying, as insufficiently irradiated building material.

10. The apparatus according to claim 9, wherein for adapting the radiation dose, the control unit is arranged for adapting the radiation dose of the radiation source for selectively exposing the building material in accordance with the layer data coinciding with an identified region having insufficiently cured building material in a preceding layer.

11. The apparatus according to claim 9, wherein the control unit is further arranged for providing a write strategy data based on an outcome of the verifying, wherein the write strategy data includes data providing the radiation dose for each location to be exposed during the selective exposing of a subsequent iteration of the method cycle.

12. The apparatus according to claim 9, wherein for adapting of the radiation dose, the control unit is arranged for setting at least one of the group consisting of:

a radiation intensity,
a duration of a radiation pulse,
a dwell time of the radiation source,
a radiation power,
a radiation wavelength, and
a radiation wavelength spectrum.

13. The apparatus according to claim 9, wherein the radiation source is at least one of the group consisting of:

a laser unit providing a laser beam,
a pulsed laser providing laser pulses for impinging on the layer of building material,
a plurality of laser units for providing a plurality of beams,
at least one laser unit and a beam splitter unit for providing a plurality of beams,
one or more laser diodes, and
an array of laser diodes.

14. The apparatus according to claim 10, wherein the radiation source comprises a laser unit for providing a laser beam, and wherein the exposure device further comprises a rotatable polygon prism for scanning the laser beam in a reciprocal motion.

15. The apparatus according to claim 10, wherein the layer deposition unit is arranged for providing the building material comprising a resin including particles of a further material embedded in the resin, and wherein the radiation source comprises a first laser unit and a second laser unit,
wherein the first laser unit is arranged for providing a laser beam at a first radiation power for photo-curing of the resin, and
wherein the second laser unit is arranged for providing a laser beam at a second radiation power for de-binding of the resin from the further material, and
wherein the second radiation power is larger than the first radiation power.

\* \* \* \* \*